US009990010B2

United States Patent
Suh et al.

(10) Patent No.: US 9,990,010 B2
(45) Date of Patent: Jun. 5, 2018

(54) ELECTRONIC DEVICE HAVING CURVED BOTTOM AND OPERATION METHOD THEREOF

(71) Applicant: Samsung Electronics Co., Ltd., Gyeonggi-do (KR)

(72) Inventors: Jung-Won Suh, Gyeonggi-do (KR); Jeong-Min Park, Gyeonggi-do (KR); Yong-Whi Lee, Seoul (KR)

(73) Assignee: Samsung Electronics Co., Ltd (KR)

( * ) Notice: Subject to any disclaimer, the term of this patent is extended or adjusted under 35 U.S.C. 154(b) by 129 days.

(21) Appl. No.: 14/915,497

(22) PCT Filed: Aug. 29, 2014

(86) PCT No.: PCT/KR2014/008088
§ 371 (c)(1),
(2) Date: Feb. 29, 2016

(87) PCT Pub. No.: WO2015/030529
PCT Pub. Date: Mar. 5, 2015

(65) Prior Publication Data
US 2016/0209886 A1  Jul. 21, 2016

(30) Foreign Application Priority Data

Aug. 30, 2013  (KR) .................. 10-2013-0104383

(51) Int. Cl.
*G09G 5/00* (2006.01)
*G06F 1/16* (2006.01)
(Continued)

(52) U.S. Cl.
CPC .......... *G06F 1/1694* (2013.01); *G06F 1/1637* (2013.01); *G06F 1/1652* (2013.01);
(Continued)

(58) Field of Classification Search
CPC ........ G06F 3/0346; G06F 3/017; G06F 3/041; G06F 3/0362; G06F 2203/04108; G06F 2203/04102
See application file for complete search history.

(56) References Cited

U.S. PATENT DOCUMENTS 8,351,298 B2 *  1/2013  De Kok .................. G01V 1/16
                                                   367/178
8,351,773 B2 *  1/2013  Nasiri ..................... A63F 13/06
                                                    396/55
(Continued)

FOREIGN PATENT DOCUMENTS

EP          1 728 142       12/2006
KR          20000001797      1/2000
(Continued)

OTHER PUBLICATIONS

European Search Report dated Apr. 12, 2017 issued in counterpart application No. 14839417.4-1972, 8 pages.
(Continued)

*Primary Examiner* — Vijay Shankar
(74) *Attorney, Agent, or Firm* — The Farrell Law Firm, P.C.

(57) ABSTRACT

An electronic device having a curved bottom capable of a rolling motion is disclosed, and includes a housing which forms an outer appearance; at least one sensor which is accommodated in the housing and configured to acquire movement data corresponding to the rolling motion; and at least one processor which is accommodated in the housing and configured to perform at least one function corresponding to the movement data.

17 Claims, 17 Drawing Sheets

(51) Int. Cl.
*G06F 3/0346* (2013.01)
*G06F 3/01* (2006.01)
*G06F 3/0362* (2013.01)
*G06F 3/041* (2006.01)

(52) U.S. Cl.
CPC ............ *G06F 3/017* (2013.01); *G06F 3/0346* (2013.01); *G06F 3/0362* (2013.01); *G06F 3/041* (2013.01); *G06F 2203/04102* (2013.01); *G06F 2203/04108* (2013.01)

(56) References Cited

U.S. PATENT DOCUMENTS

| | | | | |
|---|---|---|---|---|
| 8,488,010 | B2* | 7/2013 | Voss | H04N 5/144 348/208.1 |
| 9,569,018 | B2* | 2/2017 | Kang | G06F 3/03 |
| 2009/0265671 | A1 | 10/2009 | Sachs et al. | |
| 2010/0013651 | A1 | 1/2010 | Spalink | |
| 2010/0103770 | A1 | 4/2010 | De Kok et al. | |
| 2011/0163955 | A1 | 7/2011 | Nasiri et al. | |
| 2012/0069203 | A1 | 3/2012 | Voss et al. | |
| 2013/0100053 | A1 | 4/2013 | Kang et al. | |
| 2013/0177177 | A1 | 7/2013 | Lundin | |

FOREIGN PATENT DOCUMENTS

| | | |
|---|---|---|
| WO | WO 2005/103863 | 11/2005 |
| WO | WO 2013103181 | 7/2013 |

OTHER PUBLICATIONS

PCT/ISA/237 Written Opinion issued on PCT/KR2014/008088 (pp. 6).
PCT/ISA/210 Search Report issued on PCT/KR2014/008088 (pp. 4).

* cited by examiner

US 9,990,010 B2

ELECTRONIC DEVICE HAVING CURVED BOTTOM AND OPERATION METHOD THEREOF

TECHNICAL FIELD

Various embodiments of the present invention relate to an electronic device that may tilt by using a curved bottom and an operation method thereof.

BACKGROUND ART

Currently, with the development of the electronic communication industry, user equipment (e.g., electronic devices such as cellular phones, electronic schedulers, personal complex devices, laptop computers or the like) is becoming a necessity in modern society and is an important means for delivering rapidly changing information. The user equipment allows the user to conveniently conduct an operation through a GUI (Graphical User Interface) environment using a touch screen, and provides a variety of multimedia services that are based on the web environment.

The user equipment adopts various electronic components in order to provide a variety of functions. For example, a stereo speaker module is mounted on the user equipment in order to thereby provide a music reproduction function using a stereo sound. Alternatively, a camera module is mounted on the user equipment in order to thereby provide a photographing function. Alternatively, a communication module is mounted on the user equipment in order to thereby provide a communication function with other electronic devices through the network.

Meanwhile, the recent user equipment has been manufactured to have a variety of appearances to provide an aesthetic sense to the user.

DETAILED DESCRIPTION OF THE INVENTION

Technical Problem

Various embodiments of the present invention may provide an electronic device that may tilt by a curved bottom.

Various embodiments of the present invention may provide an electronic device that can receive a user input without using buttons or touch sensitive devices (e.g., a touch screen or a touch pad).

Technical Solution

According to an embodiment of the present invention, an operation method of an electronic device having a curved bottom may include: obtaining movement data corresponding to a rolling motion by the curved bottom; and performing one or more functions corresponding to the movement data.

According to another embodiment of the present invention, an electronic device may include: a housing that forms a curved bottom capable of making a rolling motion and forms its appearance; a screen that is disposed on one side of the housing; at least one sensor that is disposed in the housing and obtain movement data corresponding to the rolling motion; and at least one processor that is disposed in the housing and perform one or more functions corresponding to the movement data.

Advantageous Effects

Since the electronic device is controlled by moving the electronic device instead of buttons or touch sensitive devices (e.g., a touch screen or a touch pad), it is possible to provide the user with the fun and convenience of the operation.

MODE FOR CARRYING OUT THE INVENTION

Figure 1:
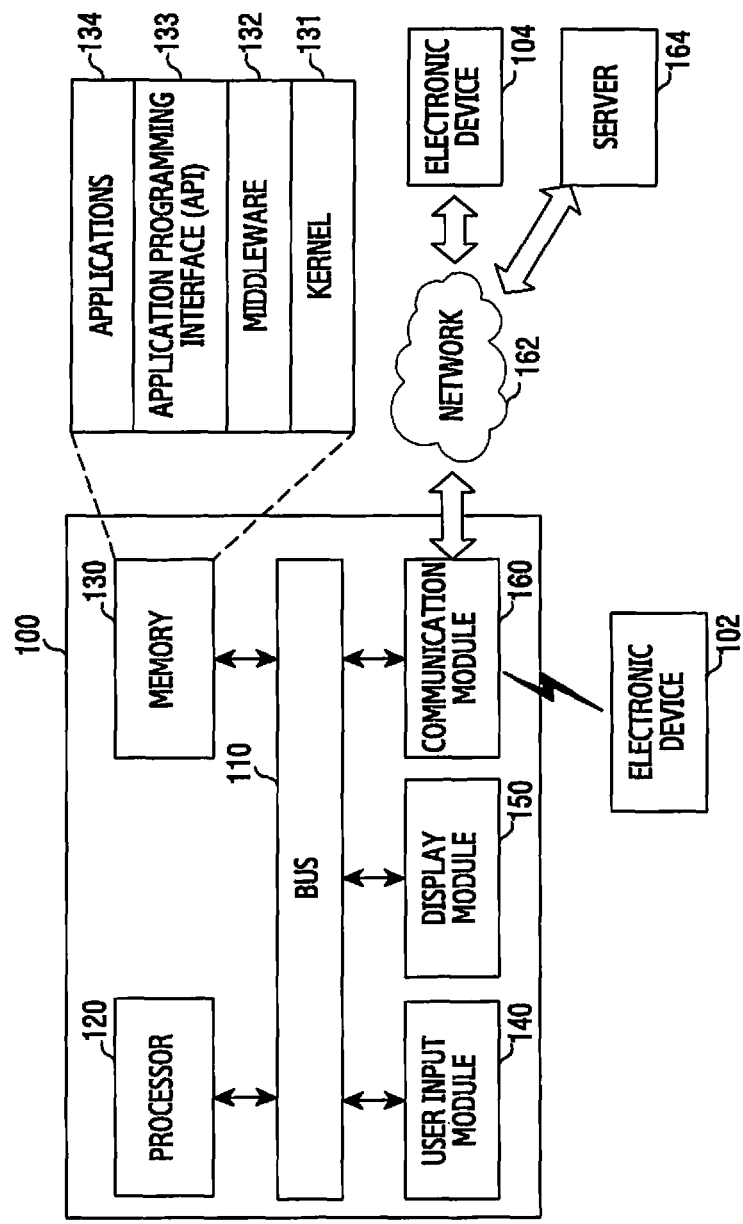
FIG. 1 illustrates a block diagram of an electronic device, according to an embodiment of the present invention.

Hereinafter, various embodiments of the present invention will be described with reference to the accompanying drawings. Although various embodiments of the present invention are illustrated in the drawings and the relevant detailed descriptions are discussed in the present invention, the present invention may include various modifications and several embodiments. Accordingly, various embodiments of the present invention are not limited to the particular forms, and it should be understood that the present invention covers all modifications and changes, equivalents, and alternatives falling within the spirit and scope of the present invention. In describing the drawings, similar reference numerals are used to designate similar elements.

An electronic device according to various embodiments of the present invention may be a device with a communication function. For example, the electronic device may include at least one of a smart phone, a tablet Personal Computer (PC), a mobile phone, a video phone, an e-book reader, a desktop PC, a laptop PC, a netbook computer, a PDA, a Portable Multimedia Player (PMP), an MP3 player, a mobile medical device, a camera, a wearable device (for example, a Head-Mounted-Device (HMD) such as electronic glasses, electronic clothes, an electronic bracelet, an electronic necklace, an electronic appcessory, an electronic tattoo, and a smart watch.

According to some embodiments, the electronic device may be a smart home appliance with a communication function. The smart home appliances may include at least one of, for example, televisions, digital video disk (DVD) players, audio players, refrigerators, air conditioners, cleaners, ovens, microwaves, washing machines, air purifiers, set-top boxes, TV boxes (e.g., HomeSync™ of Samsung, Apple TV™, or Google TV™), game consoles, electronic dictionaries, electronic keys, camcorders, or electronic frames.

According to some embodiments, the electronic device may include at least one of various types of medical devices (for example, Magnetic Resonance Angiography (MRA), Magnetic Resonance Imaging (MRI), Computed Tomography (CT), a scanning machine, ultrasonic wave device and the like), a navigation device, a Global Positioning System (GPS) receiver, an Event Data Recorder (EDR), a Flight Data Recorder (FDR), a car infotainment device, ship electronic equipment (for example, navigation equipment for a ship, a gyro compass and the like), avionics, a security device, and an industrial or home robot.

According to an embodiment, an electronic device may include at least one of a part of furniture or a building/structure having a communication function, an electronic board, an electronic signature receiving device, a projector, and various types of measuring instruments (for example, a water meter, an electric meter, a gas meter, a radio wave meter, and the like). An electronic device according to various embodiments of the present invention may be a combination of one or more of above described various devices. Also, an electronic device according to various embodiments of the present invention is not limited to the above described devices.

FIG. 1 illustrates a block diagram of an electronic device, according to an embodiment of the present invention.

Referring to FIG. 1, the electronic device 100 may include a bus 110, a processor 120, a memory 130, a user input module 140, a display module 150, or a communication module 160.

The bus 110 may be a circuit for connecting the elements mentioned above with each other and transferring communication data (e.g., control messages) between the elements above.

The processor 120 may receive commands from other elements described above (e.g., the memory 130, the user input module 140, the display module 150, the communication module 160, or the like) through, for example, the bus 110, and may decode the received commands to perform a calculation or data processing according to the decoded commands.

The memory 130 may store commands or data that are received from, or created by, the processor 120 or other elements (e.g., the user input module 140, the display module 150, the communication module 160, or the like). The memory 130, for example, may include programming modules, such as a kernel 131, middleware 132, an application programming interface (API) 133, or applications 134. Each of the above-described program modules may be implemented by software, firmware, hardware, or a combination thereof.

The kernel 131 may control or manage system resources (e.g., the bus 110, the processor 120, the memory 130, or the like) that are used for performing operations or functions implemented by other programming modules, such as the middleware 132, the API 133, or the applications 134. The kernel 131 may provide an interface by which the middleware 132, the API 133, or the applications 134 may access each element of the electronic device 100 for control or management.

The middleware 132 may play an intermediate role between the API 133 or the applications 134 and the kernel 131 to communicate with each other for the transmission and reception of data. The middleware 132, in relation to operation requests that are received from (a plurality of) applications 134, may perform load-balancing for the requests by using, for example, a method of giving priority for using system resources (e.g., the bus 110, the processor 120, or the memory 130) of the electronic device 100 to at least one of the (plurality of) applications 134.

The API 133 may be an interface by which the applications 134 control functions provided by the kernel 131 or the middleware 132, and it may include, for example, one or more interfaces or functions for file control, window control, screen processing, or text control.

The user input module 140, for example, may receive commands or data from the user and may transfer the same to the processor 120 or the memory 130 through the bus 110. The display module 150 may display images, videos, or data to the user.

The communication module 160 may connect communication between the electronic device 100 and another electronic device 102. The communication module 160 may support a predetermined short range communication protocol {e.g., Wifi (wireless fidelity), BT (Bluetooth), NFC (near field communication), or the like} or a predetermined network communication {e.g., the Internet, a LAN (local area network), a WAN (wire area network), a telecommunication network, a cellular network, a satellite network, or a POTS (plain old telephone service)} 162. Each of the electronic devices 102 and 104 may be the same device (for example, the same type) as the electronic device 100 or may be different (for example, a different type) from the same.

Figure 2:
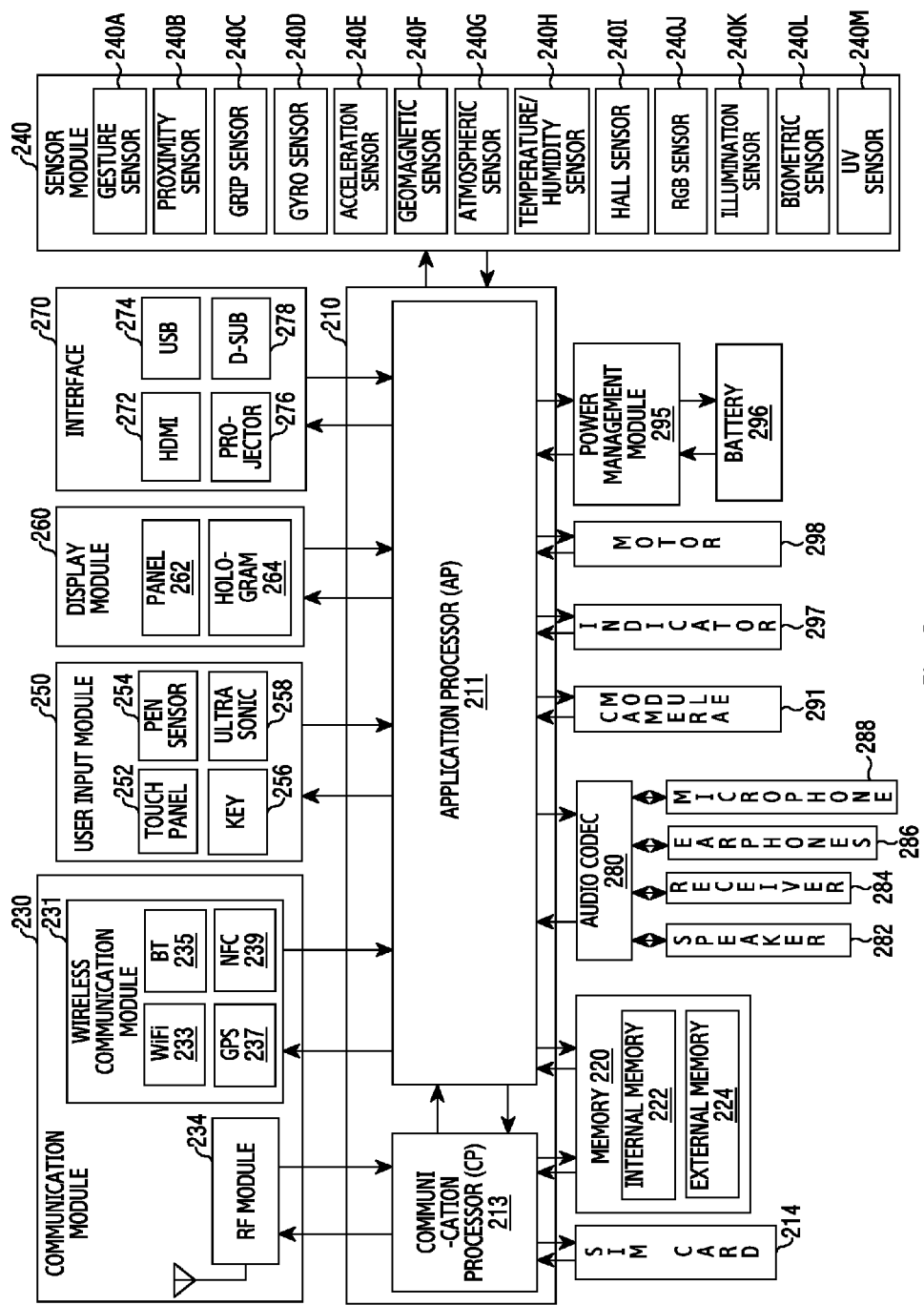
FIG. 2 illustrates a block diagram of hardware, according to an embodiment of the present invention.

FIG. 2 illustrates a block diagram of hardware, according to an embodiment of the present invention.

Referring to FIG. 2, the hardware 200 may include one or more processors 210, a SIM (subscriber identification module) card 214, a memory 220, a communication module 230, a sensor module 240, a user input module 250, a display module 260, an interface 270, an audio codec 280, a camera module 291, a power management module 295, a battery 296, an indicator 297, or a motor 298.

The processor 210 may include one or more application processors (AP) 211 or one or more communication processors (CP) 213. Although the AP 211 and the CP 213 are illustrated to be included in the processor 210 in FIG. 2, the AP 211 and the CP 213 may be separately included in different IC packages. The AP 211 and the CP 213 may be included in a single IC package.

The AP 211 may control a plurality of hardware or software elements that are connected with the AP 211, and may perform processing of a variety of data including multimedia data and a calculation, by executing an operating system or application programs. The AP 211 may be implemented by, for example, a system on chip (SoC). The processor 210 may further include a graphic processing unit (GPU) (not shown).

The CP 213 may manage the data link for the communication between the hardware 200 and other hardware devices connected thereto through the network, and may perform a function of converting a communication protocol. The CP 213, for example, may be implemented by the SoC. The CP 213 may perform at least some of the multimedia control functions. The CP 213, for example, may perform identification and authentication of a terminal in the communication network by using the subscriber identification module (e.g., the SIM card 214). The CP 213 may provide services, such as voice calls, video calls, text messages, or packet data to the user.

The CP 213 may control the data transmission and reception of the communication module 230. Although the elements, such as the CP 213, the power management module 295, or the memory 220, are illustrated to be separated from the AP 211 in FIG. 2, the AP 211 may be implemented to include at least some (e.g., the CP 213) of the elements described above.

The AP 211 or the CP 213 may load commands or data received from at least one of non-volatile memories or other elements, which are connected with the AP 211 or the CP 213, in a volatile memory, and may process the same. The AP 211 or the CP 213 may store data that is received from, or created by, one or more other elements in a non-volatile memory.

The SIM card 214 may be a card that implements the subscriber identification module, and may be inserted into a slot that is formed in a specific position of the hardware 200. The SIM card 214 may include inherent identification information {e.g., an integrated circuit card identifier (ICCID)} or subscriber information {e.g., an international mobile subscriber identity (IMSI)}.

The memory 220 may include an internal memory 222 or an external memory 224. The internal memory 222, for example, may include at least one of volatile memories (e.g., a dynamic RAM (DRAM), a static RAM (SRAM), a synchronous dynamic RAM (SDRAM), or the like) or non-volatile memories (e.g., one time programmable ROM (OTPROM), a programmable ROM (PROM), an erasable and programmable ROM (EPROM), an electrically erasable and programmable ROM (EEPROM), a mask ROM, a flash ROM, a NAND flash memory, a NOR flash memory, or the like). The internal memory 222 may be a solid state drive (SSD). The external memory 224 may further include, for example, compact flash (CF), secure digital (SD), micro secure digital (Micro-SD), mini secure digital (Mini-SD), extreme digital (xD), a memory stick, or the like.

The communication module 230 may include a wireless communication module 231 or an RF module 234. The wireless communication module 231, for example, may include a WiFi module 233, a BT (Bluetooth) module 235, a GPS module 237, or an NFC (near field communication) module 239. For example, the wireless communication module 231 may provide a wireless communication function by using a radio frequency. Additionally or alternatively, the wireless communication module 231 may include a network interface (e.g., a LAN card) or a modem for connecting the hardware 200 to the network {e.g., the Internet, a LAN (local area network), a WAN (wire area network), a telecommunication network, a cellular network, a satellite network, or a POTS (plain old telephone service)}.

The RF module 234 may transmit and receive data, and for example, may transmit and receive RF signals or the called electronic signals. Although it is not shown in the drawing, the RF module 234, for example, may include a transceiver, a PAM (power amp module), a frequency filter, or a LNA (low noise amplifier). The RF module 234 may further include components, such as conductors or cables, for transmitting and receiving electromagnetic waves through free space in wireless communication.

The sensor module 240, for example, may include at least one of a gesture sensor 240A, a proximity sensor 240B, a grip sensor 240C, a gyro sensor 240D, an acceleration sensor 240E, a geomagnetic sensor 240F, an atmospheric sensor 240G, a temperature/humidity sensor 240H, a hall sensors 240I, an RGB (red, green, blue) sensor 240J, an illuminance sensor 240K, a biometric sensor 240L, or a UV (ultra violet) sensor 240M. The sensor module 240 may measure physical quantities and may detect an operation state of the hardware to thereby convert the measured or detected information to electric signals. Alternatively/additionally, the sensor module 240 may include, for example, an E-nose sensor (not shown), an electromyography sensor (EMG) (not shown), an electroencephalogram sensor (EEG) (not shown), an electrocardiogram sensor (ECG) (not shown), or a fingerprint sensor. The sensor module 240 may further include a control circuit for controlling one or more sensors included therein.

The user input module 250 may include a touch panel 252, a (digital) pen sensor (e.g., a digitizer) 254, a key 256, or an ultrasonic input device 258. The touch panel 252 may recognize a touch input by at least one of, for example, a capacitive type, a pressure-sensitive type, an infrared type, or an ultrasonic type. The touch panel 252 may further include a controller that is not shown. In the case of a capacitive type, the proximity as well as a physical touch may be detected. The touch panel 252 may further include a tactile layer. In this case, the touch panel 252 may provide the user with a tactile reaction.

The (digital) pen sensor 254, for example, may be implemented by using at least one of a capacitive type, a pressure-sensitive type, an infrared type, or an ultrasonic type, which is identical or similar to the user's touch input method, or by using a separate recognition sheet. For example, a keypad or a touch key may be used as the key 256. The ultrasonic input device 258 may detect acoustic waves at a terminal through a pen that generates ultrasonic signals to thereby identify data, and the ultrasonic input device may perform wireless recognition. The hardware 200 may receive a user input from the external device (e.g., a network computer or a server), which is connected thereto, by using the communication module 230.

The display module 260 may include a panel 262 or a hologram 264. The panel 262, for example, may be an LCD (liquid crystal display) or an AM-OLED (active-matrix organic light-emitting diode). The panel 262, for example, may be implemented to be flexible, transparent, or wearable. The panel 262 may be configured with the touch panel 252 as a single module. The hologram 264 may display 3D images in the air by using interference of light. The display module 260 may further include a control circuit for controlling the panel 262 or the hologram 264.

The interface 270, for example, may include an HDMI (high-definition multimedia interface) 272, a USB (universal serial bus) 274, a projector 276, or a D-Sub (D-Subminiature) 278. Additionally or alternatively, the interface 270, for example, may include SD (Secure Digital)/MMC (Multi-Media Card) or IrDA (Infrared Data Association), which is not shown.

The audio codec 280 may convert a sound into an electric signal, and vice versa. The audio codec 280, for example, may process voice information that is input or output through a speaker 282, a receiver 284, earphones 286, or a microphone 288.

The camera module 291 may photograph still images and moving images. According to an embodiment, the camera module 291 may include one or more image sensors (e.g., a front lens or a rear lens), an image signal processor (ISP) (not shown), or a flash LED (not shown).

The power management module 295 may manage power of the hardware 200. Although it is not shown, the power management module 295 may include, for example, a power management integrated circuit (PMIC), a charger integrated circuit (IC), or a battery fuel gauge.

The PMIC may be mounted, for example, in the integrated circuit or the SoC semiconductor. The charging may be conducted in a wired type or a wireless type. The charger IC may charge the battery and may prevent an inflow of an excessive voltage or current from the charger. The charger IC may include a charger IC for at least one of the wired charging type or the wireless charging type. The wireless charging type may encompass, for example, a magnetic resonance type, a magnetic induction type, or an electromagnetic wave type, and additional circuits, such as coil loops, resonance circuits, or rectifiers, for wireless charging may be provided.

The battery gauge may measure, for example, the remaining power of the battery 296, a charging voltage and current, or temperature. The battery 296 may generate and supply power, and for example, may be a rechargeable battery.

The indicator 297 may show a specific state of the hardware 200 or a part thereof (e.g., the AP 211), such as a booting state, a message state, or a charging state. The motor 298 may convert an electrical signal into a mechanical vibration. An MCU (Micro Control Unit), which is not shown in the drawing, may control the sensor module 240.

Although it is not shown, the hardware 200 may include a processing device (e.g., the GPU) for supporting mobile TV. The processing device for supporting mobile TV may process media data according to the standard, such as, for example, digital multimedia broadcasting (DMB), digital video broadcasting (DVB), or media flow.

The names of the above described elements of hardware according to an embodiment may vary depending on the type of hardware. The hardware 200 according to an embodiment of the present invention may include at least one of the above-described elements. Some of the above-described elements may be omitted from the hardware 200, or the hardware 200 may further include additional elements. Also, some of the hardware components according to one embodiment may be combined into one entity, which may perform functions identical to those of the relevant components before the combination.

Figure 3:
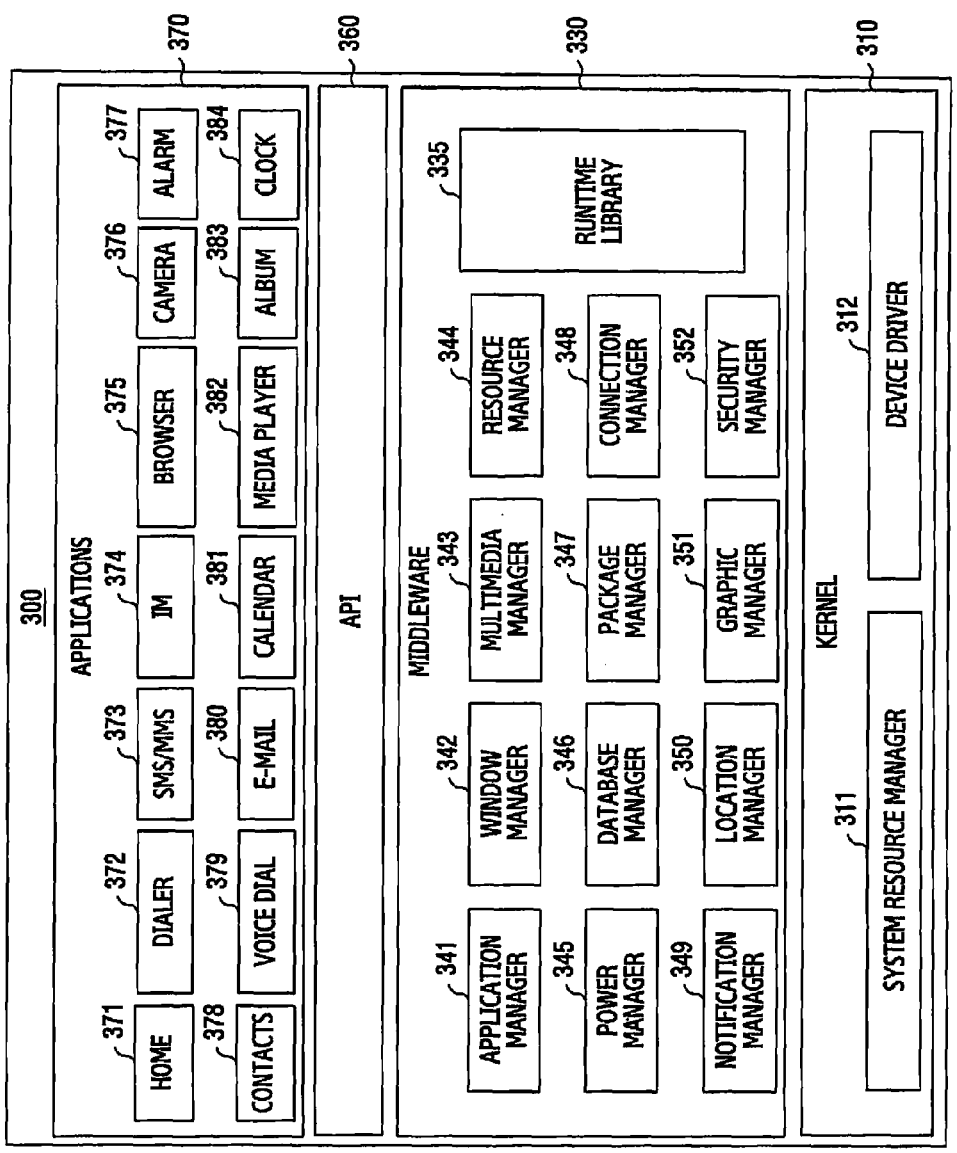
FIG. 3 illustrates a block diagram of a programming module, according to an embodiment of the present invention.

FIG. 3 illustrates a block diagram of a programming module, according to an embodiment of the present invention. The programming module 300 may be included (for example, stored) in the electronic device 100 (e.g., the memory 130) shown in FIG. 1. At least some of the programming module 300 may be configured by software, firmware, hardware, or a combination thereof. The program module 300 may be implemented in the hardware (e.g., the hardware 200) to include an operating system (OS) that controls resources related to the electronic device (e.g., the electronic device 100) or various applications (e.g., the applications 370), which are executed under the OS. For example, the OS may be Android, iOS, Windows, Symbian, Tizen, Bada, or the like.

Referring to FIG. 3, the programming module 300 may include a kernel 310, middleware 330, an API (application programming interface) 360, or applications 370.

The kernel 310 (e.g., the kernel 131) may include a system resource manager 311 or a device driver 312. The system resource manager 311, for example, may include a process management unit, a memory management unit, or a file system management unit, which is not shown in the drawing. The system resource manger 311 may perform the control, allocation, or collection of system resources. The device driver 312, for example, may include a display driver, a camera driver, a Bluetooth driver, a shared memory driver, a USB driver, a keypad driver, a WiFi driver, or an audio driver, which is not shown in the drawing. The device driver 312 may include an IPC (Inter-Process Communication) driver that is not shown.

The middleware 330 may include a plurality of modules that are implemented in advance in order to provide a common function that is necessary for the applications 370. The middleware 330 may provide functions through the API 360 in order for the applications 370 to effectively use the limited system resources inside the electronic device. For example, as shown in FIG. 3, the middleware 330 (e.g., the middleware 132) may include at least one of a run-time library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The run-time library 335, for example, may include a library module that a compiler uses in order to add new functions through programming language while the applications 370 are executed. The run-time library 335 may perform functions of the input/output management, the memory management, or an arithmetic calculation.

The application manager 341 may manage a life cycle of at least one of the applications 370. The window manager 342 may manage a GUI resource used in the screen. The multimedia manager 343 may recognize formats that are necessary for the reproduction of various media files, and may perform encoding or decoding of the media files by using a codec corresponding to the format. The resource manager 344 may manage resources, such as source codes of one or more applications 370, memories, or storages.

The power manager 345 may manage a battery or a power source in association with a basic input/output system (BIOS), and may provide power information necessary for the operation of the electronic device. The database manager 346 may create, retrieve, or change a database used in one or more applications 370. The package manager 347 may manage the installation or update of the application that is distributed in the form of a package file.

The connectivity manager 348, for example, may manage a wireless connection, such as WiFi or Bluetooth. The notification manager 349 may display or notify of events, such as received massages, appointments, or proximity notifications, in a manner that does not disturb the user. The location manager 350 may manage location information of the electronic device. The graphic manager 351 may manage graphic effects to be provided to the user and user interfaces related thereto. The security manager 352 may provide general security functions necessary for system security or user authentication. In the case where the electronic device (e.g., the electronic device 100) adopts a phone call function, the middleware 330 may further include a telephony manager (not shown) to manage a voice or video phone call function of the electronic device.

The middleware 330 may create and use a new middleware module through a combination of various functions of the above-described elements. The middleware 330 may provide modules that are specialized according to the type of operating system in order to provide differentiated functions. The middleware 330 may dynamically exclude some of the existing elements, or may further include new elements. Some of the elements described in the various embodiments of the invention may be omitted, or may be replaced by elements in different names, which perform similar functions. Alternatively, other elements may be further added thereto.

The API 360 (e.g., the API 133), which is a group of API programming functions, may be provided to have a different configuration depending on the operating system. For example, in the case of Android or iOS, a single API set may be provided for each platform. In the case of Tizen, two or more API sets may be provided.

The applications 370 (e.g., the applications 134), for example, may include preloaded applications or third party applications.

At least some of the programming module 300 may be implemented by instructions that are stored in a computer-readable storage medium. If the instruction is executed by one or more processors (e.g., the processor 120), the one or more processors may perform the function corresponding to the instruction. The computer-readable storage medium, for example, may be the memory 130. At least some of the programming module 300, for example, may be implemented (for example, executed) by the processor 120. At least some of the programming module 300 may include, for example, modules, programs, routines, a set of instructions, or processes to perform one or more functions.

The names of component elements of a programming module (for example, the programming module 300) according to various embodiments of the present invention may be different for each type of OS. A programming module according to the present invention may include at least one of the described component elements, a few of the component elements may be omitted, or additional component elements may be included.

Figure 4:
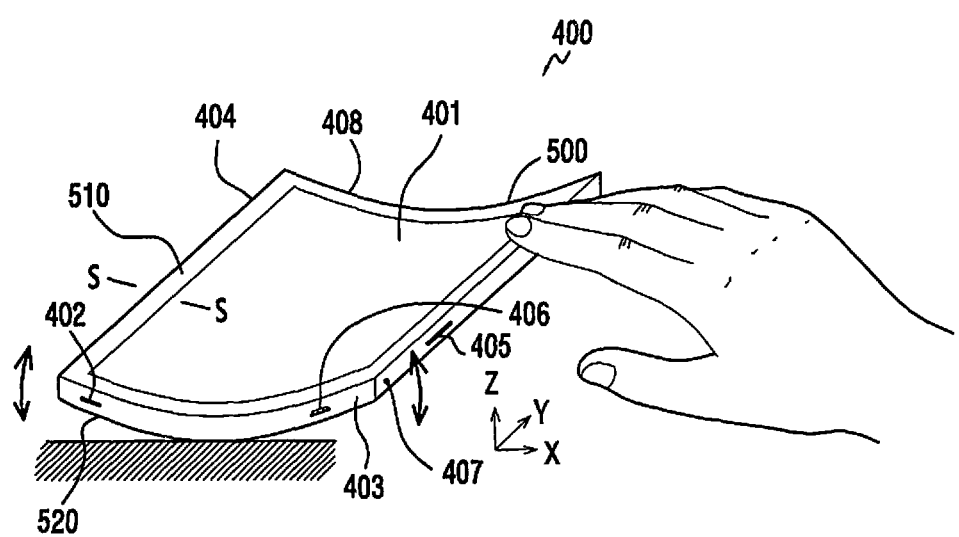
FIG. 4 is a perspective view of an electronic device, according to an embodiment of the present invention.

FIG. 4 is a perspective view of an electronic device, according to an embodiment of the present invention. The electronic device 400 may be the hardware 100 shown in FIG. 1. The electronic device 400 may include a housing 500 that forms its appearance and accommodates a plurality of electronic components. The bottom 520 of the housing 500 is shaped into a curved surface, and the electronic device 400 may make a rolling motion by the curved bottom 520 of the housing 500. The electronic device 400 may tilt to one side (e.g., forward, backward, left, or right) by the rolling motion. The electronic device 400 may simultaneously rotate and move while making the rolling motion. A touch screen 401 may be disposed on the upper portion (for example, the opposite side of the curved bottom 520) of the housing 500. The touch screen 401 may have a curved shape that is concave towards the bottom, as shown in the drawing. In addition, although it is not shown, the touch screen 401 may have a curved shape that is convex upwards.

Referring to FIG. 4, the electronic device 400 may include a touch screen 401, a speaker 402, one or more sensors 403, a camera 404, one or more keys 405, an external port 406, a microphone 407, or a jack 408.

The touch screen 401 may display images, and may receive a touch input. The touch screen 401 may include a display and a touch panel.

The speaker 402 may convert an electric signal into a sound to be output.

One or more sensors 403 (e.g., the sensor module 240) may measure physical quantities or may detect an operation state of the electronic device 400 in order to thereby convert the measured or detected information to electric signals. One or more sensors 403 may be mounted on a specific position. One or more sensors 403 may include at least one of a gesture sensor, a proximity sensor, a grip sensor, a gyro sensor, an acceleration sensor, a geomagnetic sensor, an atmospheric sensor, a temperature/humidity sensor, a hall sensor, an RGB (red, green, blue) sensor, an illuminance sensor, a biometric sensor, or a UV (Ultra Violet) sensor.

The camera 404 (e.g., the camera module 291) may photograph still images and moving images, and may include one or more image sensors, an ISP (Image Signal Processor) (not shown), or a flash LED (not shown).

The key 405 (e.g., the key 256) may include a press key or a touch key. The key 405 may include a key for adjusting the volume and a key for turning on and off the power source.

The external port 406 (e.g., the interface 270) may be used as a charging port or a port to be connected with an HDMI (high-definition multimedia interface), a USB (universal serial bus), or a D-sub (D-subminiature) cable.

The microphone 407 (e.g., the microphone 288) may convert a sound into an electrical signal.

The jack 408 may be electrically connected with the plug of the earphones (e.g., the earphones 286) or a headset. The jack 408 may be covered with a lid when it is not used.

Figure 5:
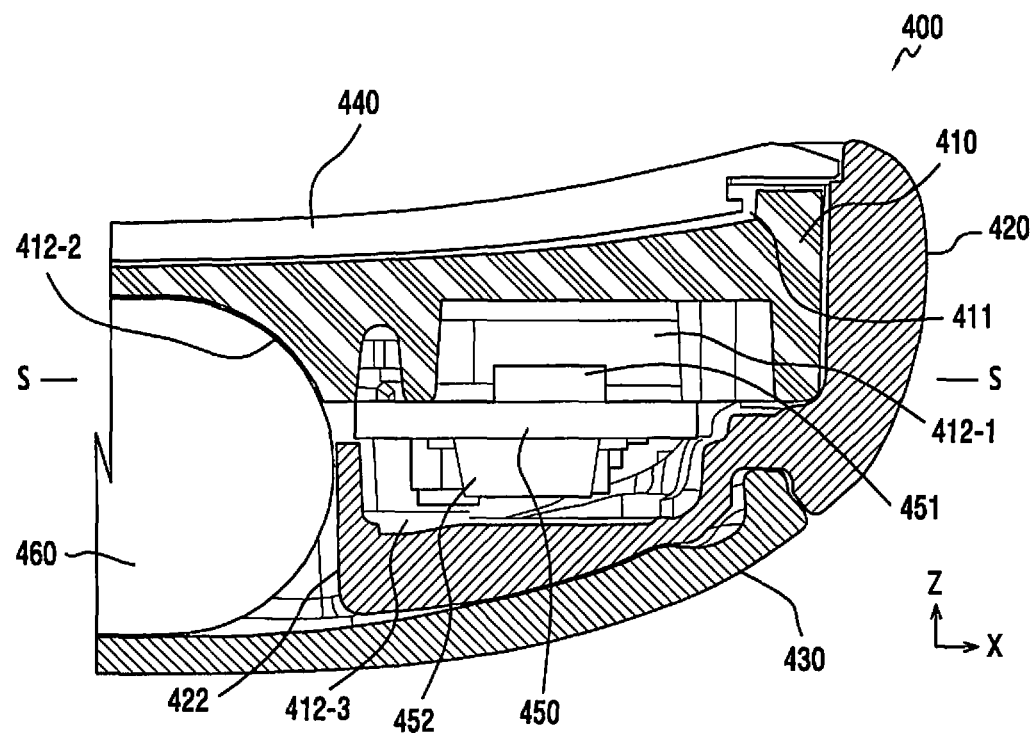
FIG. 5 is a partially cross-sectional view corresponding to the line S-S of the electronic device in FIG. 4, according to an embodiment of the present invention.

FIG. 5 is a partially cross-sectional view corresponding to the line S-S in the electronic device of FIG. 4, according to various embodiments of the present invention.

Referring to FIG. 5, the electronic device 400 may include a bracket 410, a back case 420, a battery cover 430, a touch screen module 440, a main circuit board 450, or a battery 460.

The bracket 410 may be a mounting plate to install a plurality of electronic components thereon. The bracket 410 may be formed of a non-metallic or metallic material. The bracket 410 may be a frame to fix and support a plurality of electronic components (e.g., the touch screen 401, the speaker 402, one or more sensors 403, the camera 404, one or more keys 405, the external port 406, the microphone 407, or the jack 408). The bracket 410 may have a shape corresponding to the curved surface of the electronic device 400. The touch screen module 440 may be mounted on the upper surface of the bracket 410. The main circuit board 450 may be mounted on the lower surface of the bracket 410. The bracket 410 may have electronic components including a PCB (Printed Circuit Board), which are mounted thereon. The electronic components, which are connected with the main circuit board 450 through electric connection means {e.g., cables or an FPCB (Flexible Printed Circuit Board)}, may be mounted on the bracket 410.

The bracket 410 may have a plurality of grooves that receive a number of components. For instance, the bracket 410 may have a touch screen module arrangement groove 411 on which the touch screen module 440 may rest. The touch screen module arrangement groove 411 of the bracket 410 may have a shape corresponding to the curved shape of the touch screen module 440. The bracket 410 may have a groove 412-1 that accepts the electronic components 451 that protrude upwards from the main circuit board 450. In addition, the bracket 410 may have a battery reception groove 412-2 on the lower surface, which is concave upwards to accommodate a part of the battery 460. The bracket 410 may include a metal portion (e.g., a metal coating), which may be electrically connected to the ground of the main circuit board 450.

The back case 420 may be coupled (for example, snap-fit-fastened or bolt-fastened) to the bracket 410. In an embodiment of the present invention, the back case 420 may be provided as an integral body with the battery cover 430 instead of being separated from the battery cover 430. The back case 420 may have a shape corresponding to the curved shape of the electronic device 400. The back case 420 may cover a plurality of components (e.g., the main circuit board 450), which are fixed to the bracket 410. The bracket 410, the back case 420, and the main circuit board 450 may be coupled to each other by using a bolt-fastening method. The back case 420 may have a groove 412-3 capable of accommodating the electronic components 452 that protrude downwards from the main circuit board 450. The back case 420 may have a battery through-groove 422 through which the battery 460 passes. As illustrated, the battery through-groove 422 may be an opening that extends from the top to the bottom of the back case 420, and may lead to the battery reception groove 412-2 in the container shape of the bracket 410. When the bracket 410 and the back case 420 are coupled to each other, the battery reception groove 412-2 of the bracket 410 and the battery through-groove 422 of the back case 420 may form a space in the shape of a container to accommodate the battery 460. The battery through-groove 422 of the back case 420 may be the shape of a container that fully accommodates the battery 460 by itself, and the bracket 410 may not be necessary. In addition, the battery reception groove 412-2 of the bracket 410 may be the shape of a container that fully accommodates the battery 460 by itself, and the battery through-groove 422 of the back case 420 may not be necessary. The battery 460 may be a shape corresponding to the curved shape of the electronic device 400.

The battery cover 430 may be detachably coupled to the back case 420. The battery cover 430 may include a plurality of hooks (not shown) that are fastened to a plurality of hook fastening grooves of the back case 420 on the edge thereof. The battery cover 430 may form the curved bottom 520 of the electronic device 400. The electronic device 400 may make a rolling motion by the curved bottom 520 of the battery cover 420. When all of the bracket 410, the back case 420, and the battery cover 430 are coupled, a part of the back case 420 may form the side of the electronic device 400 and the battery cover 430 forms the curved bottom 520 of the electronic device 400 while the bracket 410 is not exposed.

The touch screen module 440 may be attached to the upper portion of the bracket 410. Here, the touch screen module 440 may have a curved shape that is concave downwards. The touch screen module 440 may be electrically connected to the main circuit board 450, and may display images corresponding to signals from the main circuit board 450. The touch screen module 440 may include a window, a touch panel, and a display panel. The window is transparent and may be positioned on the touch panel in order to thereby allow the images from the display panel (e.g., the panel 262) to output to the outside. The touch panel (e.g., the touch panel 252) may be disposed under the window, and may recognize a touch input. The touch panel may be applied with at least one of a capacitive type, a pressure-sensitive type, an infrared type, or an ultrasonic type. The main circuit board 450 may receive a touch input from the touch panel. The display panel (e.g., the panel 262) may be disposed under the touch panel. The display panel may display images corresponding to signals transmitted from the main circuit board 450. The display panel may include an LCD (liquid crystal display) or an AM-OLED (active-matrix organic light-emitting diode). Here, the display panel may be implemented to be flexible. Alternatively, the display panel may be a flexible wraparound display panel. Alternatively, the display panel may be configured as a single module with the touch panel. The display panel may be configured as a single module (e.g., a touch screen) with the window and the touch panel.

The main circuit board 450 (e.g., a main board or a mother board) is the mounting plate on which a basic circuit and a plurality of electronic components are mounted. The main circuit board 450 may: configure the execution environment of the electronic device 400; keep the information thereof; secure stable driving of the electronic device 400; and facilitate the exchange, input, and output of data of all the devices in the electronic device 400. The main circuit board 450 may be coupled to the lower portion of the bracket 410 by using a fastening method, such as a bolt. At least some of the main circuit board 450 may be a shape corresponding to the curved shape of the electronic device 400.

Figure 6:
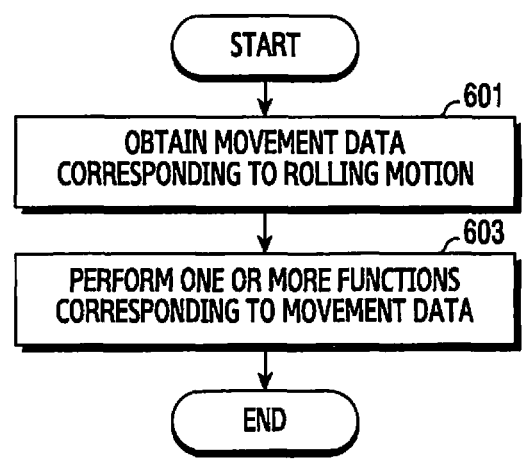
FIG. 6 is a flowchart that illustrates the operation of an electronic device, according to an embodiment of the present invention.

FIG. 6 illustrates a flowchart of the operation of the electronic device, according to an embodiment of the present invention.

Referring to FIG. 6, in operation 601, the processor 210 may obtain movement data corresponding to the rolling motion by the curved bottom 520. The processor 210 may obtain the movement data (for example, rotational direction, a rotation angle, rotation speed, a moving distance, or the like) on the rolling motion by using one or more sensors (e.g., a gyro sensor, an acceleration sensor, a geomagnetic sensor, or the like). The movement data may include dynamic data (for example, rotational direction or acceleration) on the rolling motion.

The processor 210 may obtain the movement data corresponding to the rolling motion in a standby mode (sleep mode or power saving mode). When a user's touch on a predetermined position of the electronic device 400 is detected, the processor 210 may obtain the movement data corresponding to the rolling motion. For example, if the user touches the upper edge of the housing 500 of the electronic device 400 and presses down on the same, the electronic device 400 may make a rolling motion, and the processor 210 may obtain the movement data corresponding to the rolling motion. In addition, if the user lifts up the electronic device 400 while touching the lower edge of the housing of the electronic device 400, even though the electronic device 400 makes a rolling motion, the processor 210 may not obtain the movement data corresponding to the rolling motion.

In operation 603, the processor 210 may perform one or more functions corresponding to the movement data. For example, one or more functions corresponding to the movement data may include reproducing audio content or displaying video content. One or more functions corresponding to the movement data may be the releasing of the standby mode. One or more functions corresponding to the movement data may include one or more functions regarding activated applications.

Figure 7:
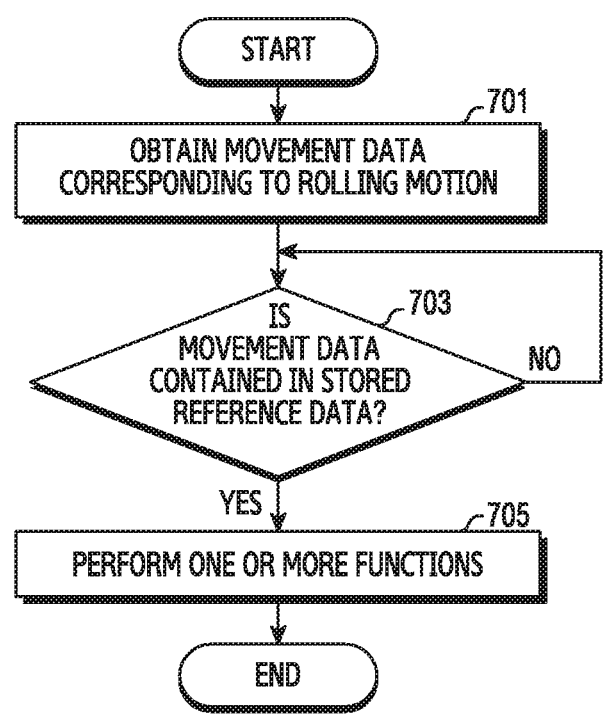
FIG. 7 is a flowchart that illustrates showing the operational of an electronic device, according to another embodiment of the present invention.

FIG. 7 illustrates a flowchart of the operation of the electronic device, according to another embodiment of the present invention.

Referring to FIG. 7, in operation 701, the processor 210 may obtain the movement data corresponding to the rolling motion by the curved bottom 520.

In operation 703, the processor 210 may identify whether or not the movement data is contained in the stored reference data.

If the movement data is contained in the stored reference data, the processor 210 may perform one or more functions in operation 705. For example, if a rotation angle due to the rolling motion does not exceed a threshold angle, the processor 210 may not perform at least one function.

Figure 8:
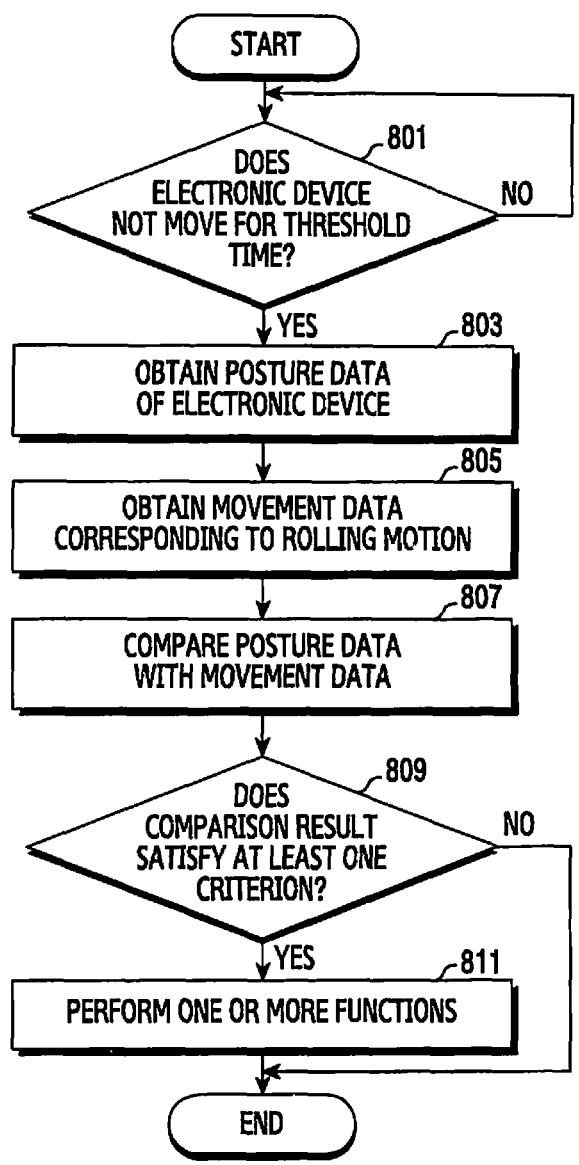
FIG. 8 is a flowchart that illustrates the operation of an electronic device, according to another embodiment of the present invention.

FIG. 8 illustrates a flowchart of the operation of the electronic device, according to another embodiment of the present invention.

Referring to FIG. 8, in operation 801, the processor 210 may identify whether or not the electronic device 400 moves within a threshold time. The processor 210 may identify whether or not the electronic device 400 moves, based on the data from one or more sensors (e.g., the gyro sensor 240D, the acceleration sensor 240E, or the geomagnetic sensor 240F).

If the electronic device 400 does not move within the threshold time, the processor 210 may obtain posture data on the electronic device 400 in operation 803. The posture data may include the dynamic data on the static posture to prepare a rolling motion.

In operation 805, after the threshold time, the processor 210 may obtain the movement data corresponding to the rolling motion of the electronic device 400 due to the curved bottom 520.

In operation 807, the processor 210 may compare the movement data and the posture data.

In operation 809, the processor 210 may determine whether or not the comparison result of the posture data and the movement data satisfies at least one criterion. For example, the processor 210 may determine that the criterion is satisfied when a change in acceleration exceeds a threshold value.

If the comparison result of the posture data and the movement data satisfies at least one criterion, the processor 210 may perform one or more functions in operation 811.

Figure 9:
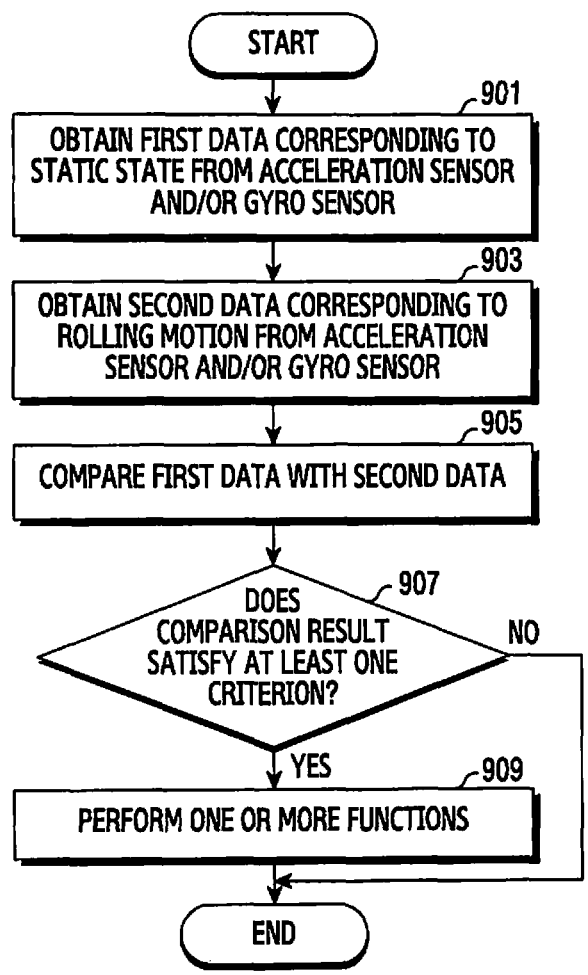
FIG. 9 is a flowchart that illustrates the operation of an electronic device, according to another embodiment of the present invention.

FIG. 9 illustrates a flowchart of the operation of the electronic device, according to another embodiment of the present invention.

Referring to FIG. 9, in operation 901, the processor 210 may obtain the first data (e.g., three-axis values), which corresponds to a static state from the acceleration sensor 240E and/or the gyro sensor 240D.

In operation 903, the processor 210 may obtain the second data (e.g., three-axis values), which corresponds to the rolling motion from the acceleration sensor 240E and/or the gyro sensor 240D.

In operation 905, the processor 210 may compare the first data and the second data.

In operation 907, the processor 210 may determine whether or not the comparison result of the first data and the second data satisfies at least one criterion.

If the comparison result of the first data and the second data satisfies at least one criterion, the processor 210 may perform one or more functions in operation 909.

Figure 10:
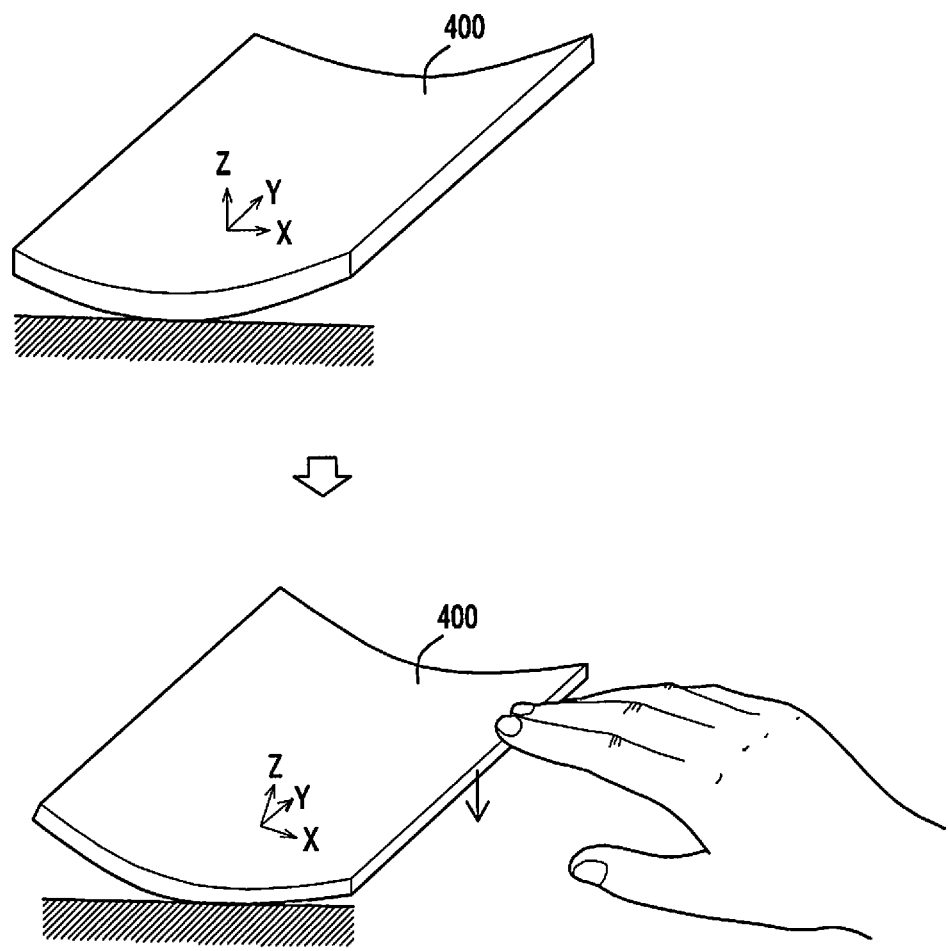
FIG. 10 is a view showing the motion of an electronic device, according to an embodiment of the present invention.

FIG. 10 is a view showing the motion of the electronic device, according to an embodiment of the present invention.

Referring to FIG. 10, when the user presses down one side edge of the electronic device 400, the electronic device 400 may make a rolling motion due to the curved bottom 520. For example, when the electronic device 400 is in the rolling motion, the electronic device 400 is rotated about the y-axis, and the processor 210 may determine whether or not a y-axis value from the gyro sensor 240D exceeds a reference value. If the y-axis value from the gyro sensor 240D exceeds the reference value, the processor 210 may determine whether or not an x-axis value of the acceleration sensor 240D is maintained to be equal to or more than a reference value. If the x-axis value of the acceleration sensor 240D is maintained to be equal to or more than the reference value, the processor 210 may take the input for the first input (e.g., a long-press input). Otherwise, the processor 210 may take the input for the second input (e.g., a short-press input).

Figure 11:
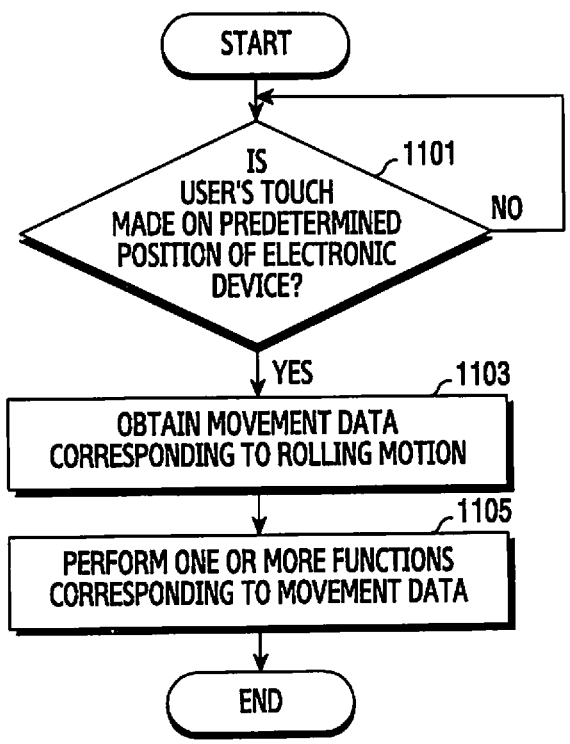
FIG. 11 is a flowchart that illustrates the operation of an electronic device, according to an embodiment of the present invention.

FIG. 11 illustrates a flowchart of the operation of the electronic device, according to an embodiment of the present invention.

Referring to FIG. 11, in operation 1101, the processor 210 may identify whether or not a user's touch is made on a predetermined position of the electronic device 400 by using one or more sensors (e.g., the proximity sensor 240B, the grip sensor 240C, or the like).

If the user's touch is made on the predetermined position of the electronic device 400, in operation 1103, the processor 210 may obtain the movement data corresponding to the rolling motion by using one or more sensors (e.g., the proximity sensor 240B, the gyro sensor 240D, the acceleration sensor 240E, or the geomagnetic sensor 240F). On the contrary, if the user's touch is not made on the predetermined position of the electronic device 400, the processor 210 may not obtain the movement data corresponding to the rolling motion. For example, if the user presses down the upper edge of the housing 500 of the electronic device 400, the electronic device 400 makes a rolling motion, and the processor 210 may obtain the movement data corresponding to the rolling motion. In addition, if the user lifts up the lower edge of the housing 500 of the electronic device 400 while touching the same, the electronic device 400 makes a rolling motion, but the processor 210 may not obtain the movement data corresponding to the rolling motion.

In operation 1105, the processor 210 may perform one or more functions corresponding to the movement data.

Figure 12:
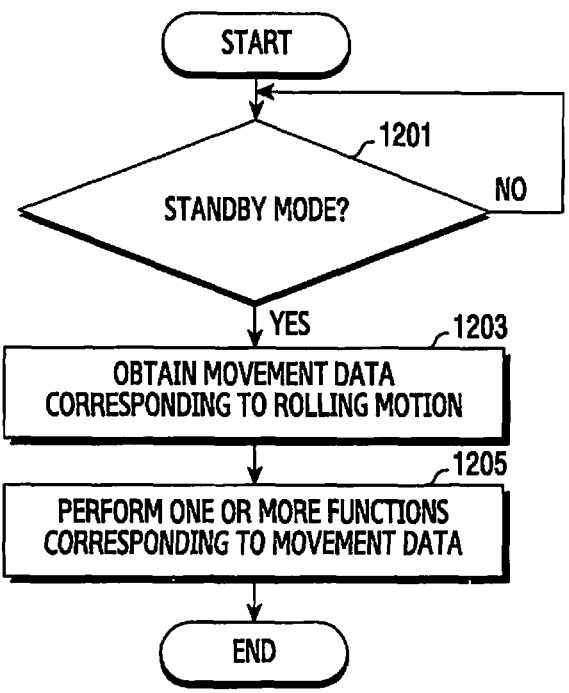
FIG. 12 is a flowchart that illustrates the operation of an electronic device, according to another embodiment of the present invention.

FIG. 12 illustrates a flowchart showing the operation of the electronic device, according to another embodiment of the present invention.

Referring to FIG. 12, in operation 1201, the processor 210 may determine whether or not the electronic device is in the standby mode.

If the electronic device is in the standby mode, the processor 210 may obtain the movement data corresponding to the rolling motion in operation 1203.

In operation 1205, the processor 210 may perform one or more functions (e.g., releasing of the standby mode, displaying of notification information, or the like) corresponding to the movement data.

Figure 13:
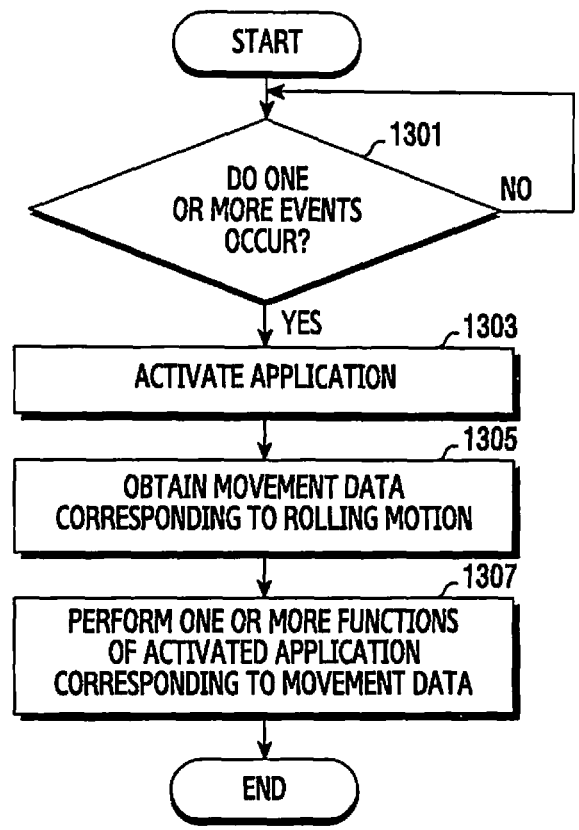
FIG. 13 is a flowchart that illustrates the operation of an electronic device, according to another embodiment of the present invention.

FIG. 13 illustrates a flowchart showing the operations of the electronic device, according to another embodiment of the present invention.

Referring to FIG. 13, in operation 1301, the processor 210 may identify whether or not one or more events (e.g., call reception, message reception, the arrival of a specific time, or the like) occur.

In operation 1303, the processor 210 may activate a specific application in response to the event. For example, when receiving a call, the processor 210 may activate a call application. In addition, when receiving a message, the processor 210 may activate a messaging application.

In operation 1305, the processor 210 may obtain the movement data corresponding to the rolling motion from one or more sensors (e.g., the proximity sensor 240B, the gyro sensor 240D, the acceleration sensor 240E, or the geomagnetic sensor 240F).

In operation 1307, the processor 210 may perform one or more functions of the activated application corresponding to the movement data.

Figure 14:
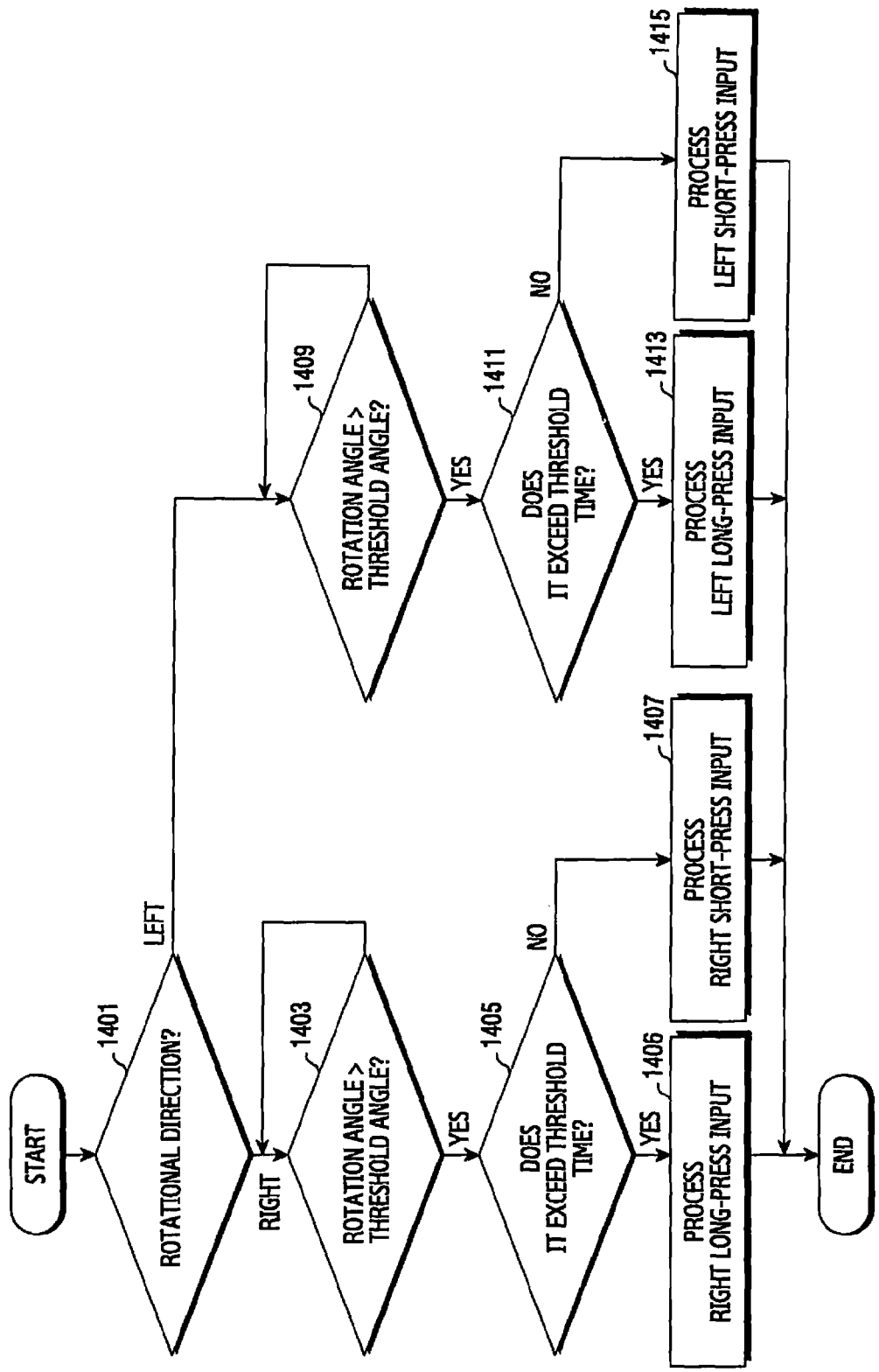
FIG. 14 is a flowchart that illustrates the operation of an electronic device, according to another embodiment of the present invention.

FIG. 14 illustrates a flowchart showing the operations of the electronic device, according to another embodiment of the present invention.

In operation 1401, the processor 210 may identify the rotational direction of the rolling motion of the electronic device 400 due to the curved bottom 520.

If the electronic device 400 rotates to the right due to the rolling motion, the processor 210 may determine whether or not the rotation angle thereof exceeds a threshold angle in operation 1403.

If the rotation angle exceeds the threshold angle, the processor 210 may determine whether or not the time, for which the rotation angle exceeding the threshold angle remains, is greater than a threshold time in operation 1405.

If the time, for which the rotation angle exceeding the threshold angle remains, is greater than the threshold time, the processor 210 may take the input for a right long-press input and may process the same in operation 1406. If the time, for which the rotation angle exceeding the threshold angle remains, is not greater than the threshold time, the processor 210 may take the input for a right short-press input and may process the same in operation 1407.

If the electronic device 400 rotates to the left due to the rolling motion, the processor 210 may determine whether or not the rotation angle thereof exceeds a threshold angle in operation 1409.

If the rotation angle exceeds the threshold angle, the processor 210 may determine whether or not the time, for which the rotation angle exceeding the threshold angle remains, is greater than a threshold time in operation 1411.

If the time, for which the rotation angle exceeding the threshold angle remains, is greater than the threshold time, the processor 210 may take the input for a left long-press input and may process the same in operation 1413. If the time, for which the rotation angle exceeding the threshold angle remains, is not greater than the threshold time, the processor 210 may take the input for a left short-press input and may process the same in operation 1415.

Figure 15:
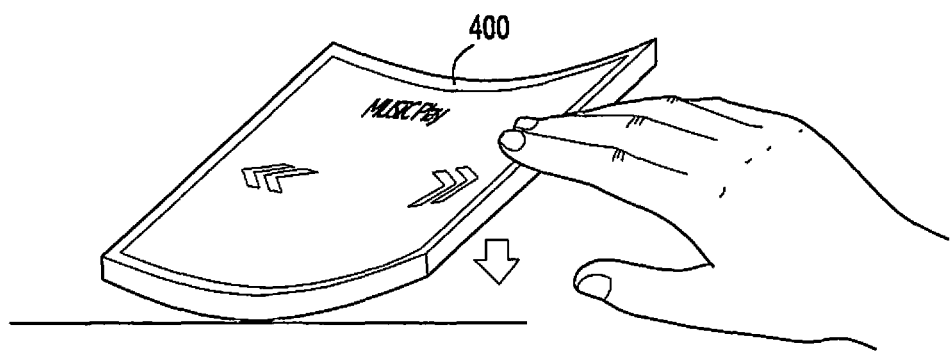
FIG. 15 to FIG. 17 are views showing the operation of the electronic device, according to various embodiments of the present invention.
Figure 16:
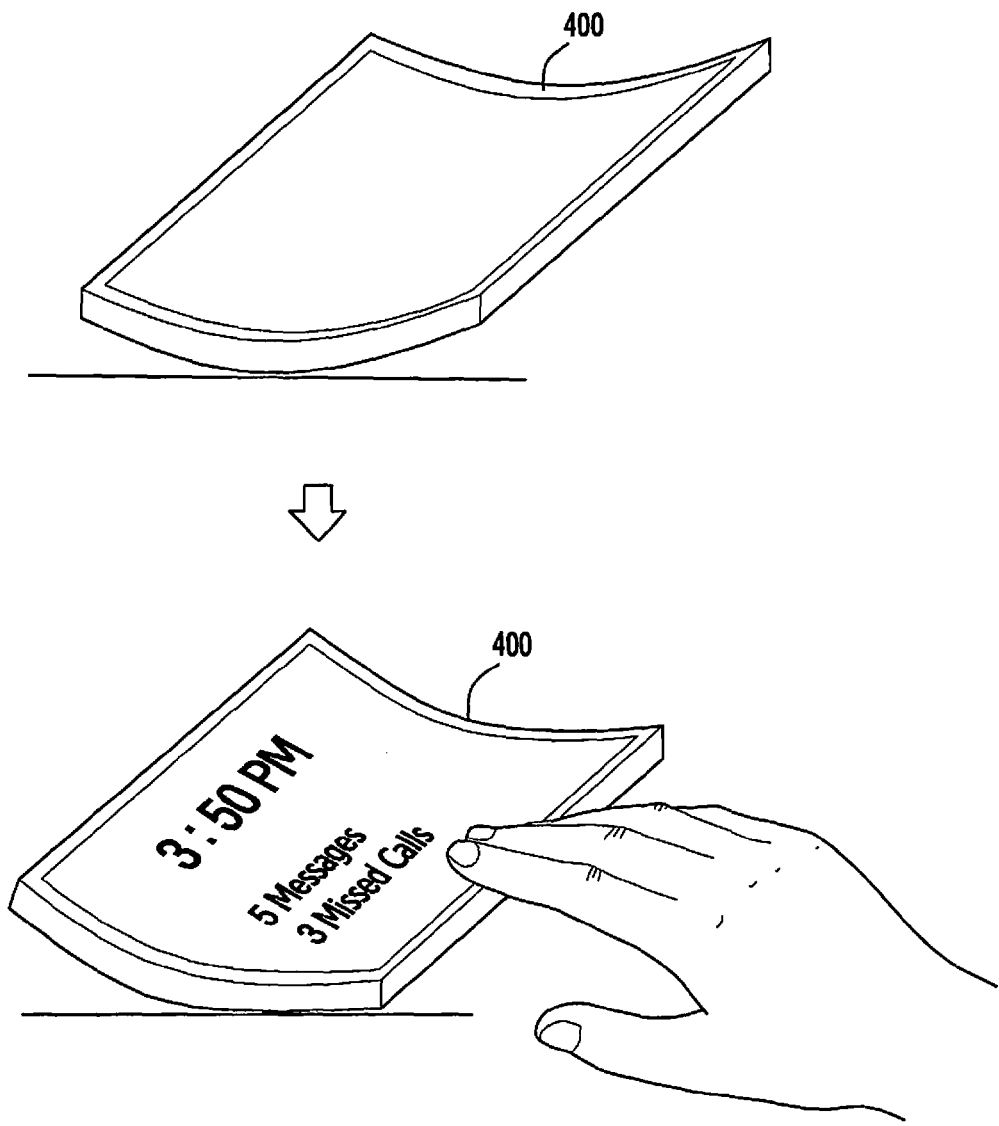
Figure 17:
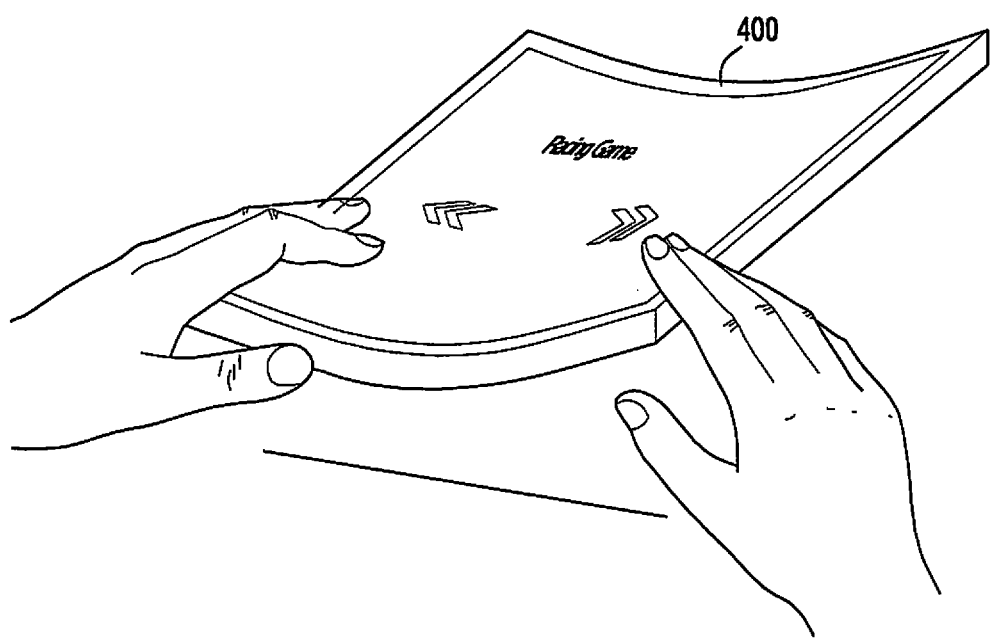

FIG. 15 to FIG. 17 are views showing the operation of the electronic device, according to various embodiments of the present invention.

Referring to FIG. 15, the electronic device 400 may reproduce the next song in response to a right short-press gesture of the user while reproducing the music. In addition, the electronic device 400 may reproduce the previous song in response to a left short-press gesture of the user while reproducing the music.

Referring to FIG. 16, in response to a right or left long-press gesture of the user in the standby mode, the electronic device 400 may release the standby mode and may display a variety of notification information (e.g., time, messages, or the like), which corresponds to the tilted direction to the left or right Referring to FIG. 17, in response to the right or left press gesture of the user during the execution of a game application, the electronic device 400 may move and display moving objects (e.g., cars) in the game. Alternatively, the electronic device 400 may detect the degree of the slope to the left or right with respect to the equilibrium state, and may control the moving objects in the game according thereto.

Although specific exemplary embodiments have been described in the detailed description of the present invention, various change and modifications may be made without departing from the spirit and scope of the present invention. Therefore, the scope of the present invention should not be defined as being limited to the embodiments, but should be defined by the appended claims and equivalents thereof.

Methods stated in claims and/or specifications according to various embodiments may be implemented by hardware, software, or a combination of hardware and software.

In the implementation of software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the present invention as defined by the appended claims and/or disclosed herein.

The programs (software modules or software) may be stored in non-volatile memories including a random access memory and a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs), or other type optical storage devices, or a magnetic cassette. Alternatively, any combination of some or all of the may form a memory in which the program is stored. Further, a plurality of such memories may be included in the electronic device.

The invention claimed is:

1. An electronic device comprising:
a housing that forms a curved bottom capable of making a rolling motion and forms an appearance of the electronic device;
a screen that is disposed on one side of the housing; and
at least one processor that is disposed in the housing and is configured to:
obtain movement data corresponding to the rolling motion of the electronic device by the curved bottom, the movement data comprising three-axis values from one of an acceleration sensor or a gyro sensor,
determine the rolling motion of the electronic device as a long-press input or a short-press input based on the movement data, and
perform at least one function corresponding to the determination of the long-press input or the short-press input.

2. The electronic device of claim 1, wherein the at least one processor is further configured to:
obtain posture data of the electronic device if the electronic device does not move within a threshold time, the posture data comprising three-axis values from the acceleration sensor or the gyro sensor, and
determine the rolling motion of the electronic device as the long-press input or the short-press input based on a comparison result of the posture data and the movement data.

3. The electronic device of claim 1, wherein the at least one processor is configured to obtain the movement data corresponding to the rolling motion in a standby mode.

4. The electronic device of claim 3, wherein the standby mode is a sleep mode or a power saving mode.

5. The electronic device of claim 1, wherein the at least one processor is configured to obtain the movement data corresponding to the rolling motion of the electronic device if a user's touch is made on a predetermined position of the electronic device.

6. The electronic device of claim 1, wherein the at least one function includes releasing a standby mode.

7. The electronic device of claim 1, wherein the at least one function includes at least one function related to an activated application.

8. An operation method of an electronic device having a curved bottom, the method comprising:
obtaining movement data corresponding to a rolling motion of the electronic device by the curved bottom, the movement data comprising three-axis values from one of an acceleration sensor or a gyro sensor;
determining the rolling motion of the electronic device as a long-press input or a short-press input based on the movement data; and
performing at least one function corresponding to the determination of the long-press input or the short-press input.

9. The method of claim 8, wherein obtaining the movement data corresponding to the rolling motion of the electronic device comprises obtaining the movement data corresponding to the rolling motion in a standby mode.

10. The method of claim 9, wherein the standby mode is a sleep mode or a power saving mode.

11. The method of claim 8, wherein obtaining the movement data corresponding to the rolling motion of the electronic device comprises, if a user's touch is made on a predetermined position of the electronic device, obtaining the movement data corresponding to the rolling motion of the electronic device.

12. The method of claim 8, wherein the at least one function includes the reproducing of audio content or displaying of video content.

13. The method of claim 8, wherein the at least one function includes releasing a standby mode.

14. The method of claim 8, wherein the at least one function includes at least one function related to an activated application.

15. The method of claim 14, further comprising activating the application in response to at least one event.

16. The method of claim 15, wherein the at least one event includes at least one of call reception, message reception, or the arrival of a specific time.

17. The method of claim 8, further comprising obtaining posture data of the electronic device if the electronic device does not move within a threshold time, the posture data comprising the three-axis values from the acceleration sensor or the gyro sensor,
wherein determining the rolling motion of the electronic device as the long-press input or the short-press input based on the movement data comprises:
determining the rolling motion of the electronic device as the long-press input or the short-press input based on a comparison result of the posture data and the movement data.

* * * * *